Patented Mar. 18, 1941

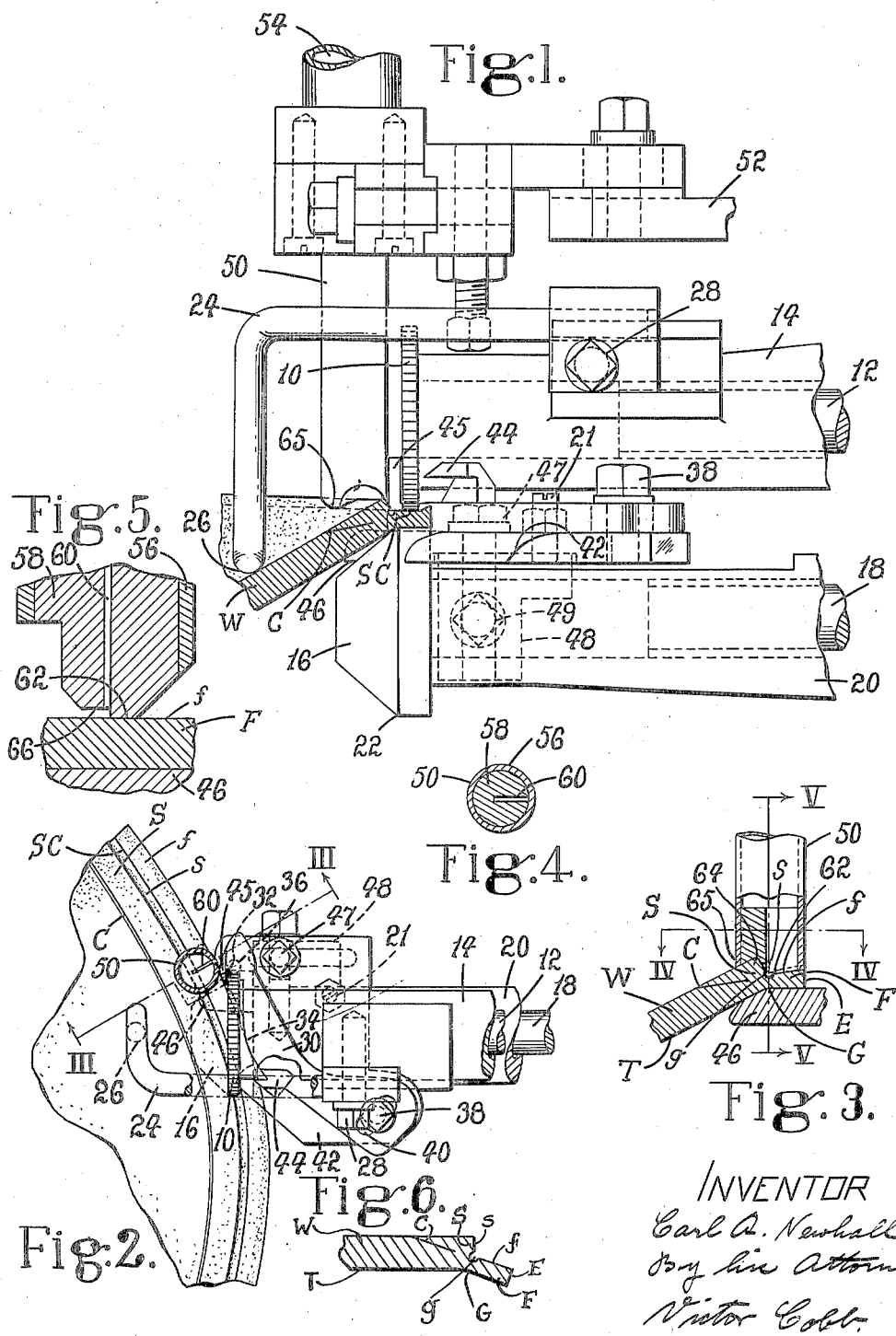

2,234,974

UNITED STATES PATENT OFFICE 2,234,974

SOLE CEMENTING MACHINE

Carl A. Newhall, Peabody, Mass., assignor to United Shoe Machinery Corporation, Borough of Flemington, N. J., a corporation of New Jersey Application December 21, 1938, Serial No. 247,029

5 Claims. (Cl. 12—80)

This invention relates to machines for applying adhesive, hereinafter called cement, to the margins of soles, and it is herein illustrated as embodied in a machine for applying cement to the shoulder channel of a sole for a turn shoe.

In the manufacture of turn shoes, it has long been customary to make a marginal or shoulder channel in the flesh surface of the outsole and this channel usually has a feather substantially parallel to the tread surface of the sole, the width of the feather being defined by a practically vertical shoulder. In the shoulder channel found in outsoles employed in carrying out the method described in Letters Patent of the United States No. 2,107,501, granted February 8, 1938, upon the application of Edward Quinn, the feather lies at an inclination to the tread surface of the sole and usually a thread receiving groove is provided at the corner between the feather and the shoulder. After the channeling operation, the margin of the sole, which contains the feather, is molded, being bent toward the tread surface of the sole. Further, in carrying out the method, the margin of the upper and lining, which have been cut to exact size, are held in the shoulder channel temporarily by means of cement until the stitching operation has been completed.

Accordingly, an object of the invention is to provide an improved cement applying machine for use in coating the shoulder channels of turn shoes.

To this end, and in accordance with features of the invention, the illustrated machine is arranged to apply cement to the side face of the shoulder, to the stitch receiving groove and to a portion of the feather in a sole for a shoe of the Quinn type.

Further, in order to avoid disturbing the molded margin of the sole, the machine is provided with a work feeding mechanism having a work supporting roll ridged to enter the shallow groove in the tread surface of the sole and the machine has a two-point gage, which is adjustable to various angular relations with respect to the plane of the feed roll, so as to control the lateral drag of the sole against the gage.

These and other features of the invention will be described in the following specification, taken in connection with the accompanying drawing, in which—

Fig. 1 is an elevation of the work engaging tools of the machine with a piece of work shown in section;

Fig. 2 is a plan view of the operating tools illustrating their relation to a fragment of the work;

Fig. 3 is a vertical section on the line III—III of Fig. 2, taken through the nozzle;

Fig. 4 is a horizontal section through the nozzle on the line IV—IV of Fig. 3;

Fig. 5 is a vertical section, enlarged, through the nozzle on the line V—V of Fig. 3; and Fig. 6 is a vertical section through one edge of a sole of the type being treated.

The invention, as illustrated, is applied to a machine of the type shown in Letters Patent of the United States No. 2,073,647, granted March 16, 1937, upon the application of C. A. Newhall, to which patent reference may be had for a description of such parts of the machine as are not herein fully shown and described. As in that machine an upper feed wheel 10, in the form of a thin toothed disk, is mounted on a driven shaft 12 passing through an arm 14, which is rigidly attached to the frame (not shown). A work supporting roll 16, which cooperates with the feed roll, is mounted on a driven shaft 18 passing through a pivoted arm 20.

The machine is particularly adapted for the coating of the shoulder channels SC of soles W having a feather F, which is provided with a thickened edge E and is bent toward the tread surface T of the sole by a molding operation to form a reentrant angle or shallow groove in that surface as shown in Fig. 3 at G. It is desired to apply cement, as by a nozzle 50, to most of the width of the upper surface f of the feather F and to the lateral surface s of the shoulder S, these surfaces s and f being joined by a stitch receiving groove g. The sole is also provided with the usual stitch receiving channel C.

It will be noted that the face of the work supporting roll 16 is formed with an angle at 22 which cooperates with the angle G in the tread face of the sole, so that the grip of the feed rolls 10 and 16 will not destroy the shape already imparted to the sole by molding. In order further to offset any danger that the operator will hold the sole W at an angle tending to destroy the molding effect, the machine is provided with a horizontal arm 24 which is bent forwardly away from the operator in a horizontal plane and then downwardly and toward the operator to provide a depending rounded end 26 bearing against the flesh surface of the sole W. This arm 24 is held on the arm 14 by a clamp screw 28 which permits the arm to be adjusted laterally.

As in the patented machine, the line of feed is determined by a gage plate 30 having contact points 32 and 34 against which the edge of the sole rests. This line of feed is at a slight angle to the plane of the end face of the feed roll 10, so that the feed roll exerts a lateral drag upon the work tending to push it always closer to the edge gage. The utility of the spaced contact points 32 and 34 is described in the Newhall patent above-mentioned. It is desirable, because of the flimsy quality of the leather employed for some soles, to be able to vary the angular relation between the gage 30 and the feed wheels to avoid an undue pressing of the edge against the gage. To this end the gage is pivoted on a stud 36, located near the forward contact point 32, considered with respect to the direction of movement of the work, to avoid disturbing the relation of the point 32 to the nozzle 50, and is held in the desired adjusted position by means of a screw 38 passing through a slot 40 in the gage plate. The gage 30 will also be adjusted at such an angle that the feed wheel 10 touches only the feather F and does not contact with the shoulder S (Fig. 2). Beneath the gage is a supporting plate 42 provided with a rounded edge and mounted at the in-going side of the machine, while above this plate the gage is provided with an overhanging lip 44 to prevent undue tilting of soles which are curved lengthwise. At the contact point 32, the gage has an upright pin 45 so that the soles will not override the gage. At the leaving side of the machine a rounded supporting projection 46 from the plate 42 underlies the feather F nearly opposite the point of engagement of the nozzle 50. The work supporting plate 42 is secured to a block 48 by a screw 47, there being a tongue and groove connection between them, and a screw 49 holds the block 48 on the arm 20.

The application of cement to the shoulder channel SC of the sole, and especially to the groove g and portions of the surfaces s and f, is effected by the nozzle 50 adjustably supported upon a pivoted arm 52, as in the patented machine, and supplied through a pipe 54 with cement under pressure. This nozzle 50 is made up of a tube 56, the lower end of which is closed by a plug 58 having a substantially radial, vertical slot 60. The lower end of the nozzle is arranged to ride upon the work and, accordingly, it is provided with a ridge 62 and a groove 64. The ridge 62 of the nozzle, which is intersected by the outlet slot 60, is received in the channel of the outsole, while the grooved portion 64 of the nozzle has a depending lip 65 which overlies the corner of the shoulder S, thus helping to maintain the position of the work with respect to the nozzle and ensuring the deposition of cement upon the surfaces s and f without danger of flooding the adjacent surfaces, such as the upper surface of the sole W. It will be noted from Fig. 5, that the lower end of the plug 58 is cut off shorter at one side to form a horizontal surface 66, which helps to determine the thickness of the band of cement applied to the channel and spreads it evenly thereon.

In using the machine to apply cement to a sole W, the arm 20, which drops to a lower position when no work is being presented to the machine, is raised by a connection to a treadle (not shown), and this treadle is effective at the same time to permit the delivery of a quantity of cement under pressure to the pipe 54 and thence to the nozzle. The sole W, positioned with its edge E in contact with the gage points 32 and 34, is gripped between the feed wheels 10 and 16 and is carried around substantially automatically without further guidance, so that cement is deposited upon the surfaces s and f around the periphery of the sole. The operator then releases the treadle, allowing the arm 20 to drop and, removing one piece of work, presents another to the machine.

Having described my invention, what I claim as new and desire to secure by Letters Patent of the United States is:

1. In a machine for coating the shoulder channels of soles for turn shoes having a shoulder and a feather, a nozzle having a ridge and a groove extending transversely of the end of the nozzle for engagement with the work, a passage in the nozzle intersecting the ridged portion thereof to deliver cement to a lateral surface of the shoulder and to the feather of the sole, means for supporting the sole with the grooved portion of the nozzle overlying the shoulder, and means for delivering coating material to the nozzle.

2. In a machine for applying cement to channeled soles for turn shoes having a feather defined by a shoulder, said feather being positioned to form a reentrant angle along the opposite surface of the sole, sole-feeding rolls engaging the feather and including a supporting roll having an angular face received in the angle in the surface of the sole, a nozzle having a ridged work-contacting portion traversed by an outlet slot, and means for delivering cement through said slot to coat a portion of the shoulder and a portion of the feather.

3. In a machine for coating soles, sole-feeding means engaging the margin of the sole, means for coating the marginal portion of the sole, a gage member having spaced contact points, said gage member being pivotally mounted adjacent to one contact point, and means for adjustably holding the other end of the gage to determine the position of the other contact point.

4. In a machine for coating the shoulder channels of soles for turn shoes having a shoulder and a feather angularly related to each other, a nozzle having a tubular body portion, a plug closing the lower end of the body portion, said plug having a radial slot extending axially of the body portion, the end of the nozzle comprising angularly related surfaces on said plug extending transversely to said slot, means for supporting the sole with the angularly related surfaces of the shoulder and feather adjacent to and facing the angularly related surfaces on the plug, and means for delivering coating material through said slot to the shoulder and feather of the sole.

5. In a machine for applying a stripe of coating material to the margin of a sole, applying means, a gage member having spaced front and rear contact points, a feeding mechanism for urging the work forwardly and also laterally against the gage member, said gage member being pivotally mounted adjacent to said forward contact point, and means for securing the other end of the gage member in adjusted position.

CARL A. NEWHALL.